UNITED STATES PATENT OFFICE.

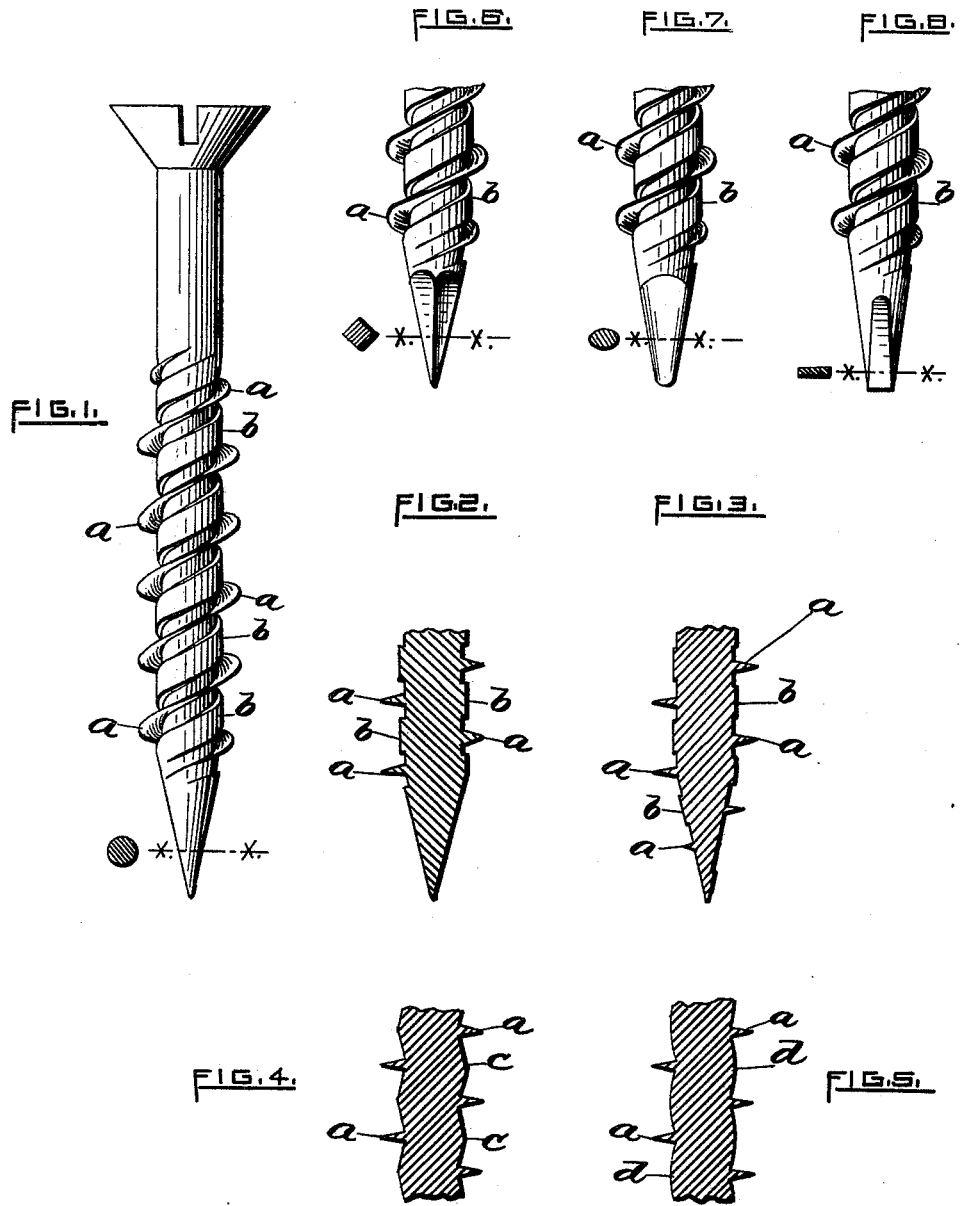

CHARLES D. ROGERS, OF PROVIDENCE, RHODE ISLAND, ASSIGNOR TO THE AMERICAN SCREW COMPANY, OF SAME PLACE.

DRIVE-SCREW.

SPECIFICATION forming part of Letters Patent No. 410,698, dated September 10, 1889.

Application filed April 6, 1889. Serial No. 306,178. (No model.)

*To all whom it may concern:*

Be it known that I, CHARLES D. ROGERS, a citizen of the United States, residing at Providence, in the county of Providence and State of Rhode Island, have invented certain new and useful Improvements in Screws; and I do hereby declare the following to be a full, clear, and exact description of the invention, such as will enable others skilled in the art to which it appertains to make and use the same, reference being had to the accompanying drawings and to letters or figures of reference marked thereon, which form a part of this specification.

In wood-screws and in many other kinds of screws the bottom of the grooves between the threads is a spiral cylindrical surface, which if developed into a plane would be flat. This surface, the area of which is often more than half the area of the cylinder from which the screw is formed, contributes nothing to the holding capacity of the screw except by its friction upon the corresponding plane surface of the wood or nut in which it is inserted. With a screw of a given diameter and a thread of a given shape and size the pitch of the thread depends upon the width of the groove, and an increase in the width of the groove increases the surface which is comparatively inefficient in the holding capacity of the screw. My improvement makes the bottom of the groove efficient in its hold upon the wood or nut in which it is inserted. This I do by giving different diameters to different parts of the bottom of a groove, so as to form surfaces inclined to the axis of a screw and produce surfaces which will resist a longitudinal strain upon the screw. Such surfaces may be regarded as minor threads or ribs and grooves auxiliary to the larger threads or ribs which engage more deeply with the wood or nut.

In the drawings hereto annexed, one form of my improved screw is represented in Figure 1, in which a rectangular rib is formed at the bottom of a wide groove between the principal threads. Fig. 2 is a longitudinal section of the lower part of the screw represented in Fig. 1. Fig. 3 is a similar section of a screw with the threads extending to the point. Figs. 4 and 5 represent different forms which may be given to the bottom of a groove. Figs. 6, 7, 8 show different forms which may be given to the point of a screw.

In all the figures, $a$ represents the principal thread or rib of a common form, and in Figs. 1, 2, and 3 $b$ represents a rectangular thread or rib at the bottom of the groove between the principal threads.

In Fig. 4, $c$ represents an angular rib at the bottom of the groove, and in Fig. 5 $d$ represents a curved convex rib. It is obvious that while these low projecting surfaces might not of themselves be efficient for the introduction of the screw into wood or a nut they add materially to its capacity to resist a longitudinal strain.

The bottom of a groove might be formed of a number of the common V-shaped or rectangular grooves and threads or ribs of low elevation. All these forms may be produced by cutting away the metal in the ordinary way or by rolling in the manner described in a patent granted to me September 20, 1887, No. 370,354.

I claim—

A rolled screw having the diameter of the threaded portion exceeding that of the plain or unthreaded portion, and having the bottom of the grooves between the said threads formed into low auxiliary ribs or projecting surfaces, the outer faces of which have substantially the same diameter as the said unthreaded portion.

In testimony whereof I have affixed my signature in presence of two witnesses.

CHARLES D. ROGERS.

Witnesses:
 CHARLES HANNIGAN,
 GEO. H. REMINGTON.